(12) United States Patent
Mino

(10) Patent No.: US 7,864,411 B2
(45) Date of Patent: Jan. 4, 2011

(54) OPTICAL AMPLIFIER, OPTICAL AMPLIFIER CONTROLLER AND CONTROL METHOD OF THE SAME

(75) Inventor: Katsuyuki Mino, Tokyo (JP)

(73) Assignee: NEC Corporation, Tokyo (JP)

( * ) Notice: Subject to any disclaimer, the term of this patent is extended or adjusted under 35 U.S.C. 154(b) by 265 days.

(21) Appl. No.: 12/044,527

(22) Filed: Mar. 7, 2008

(65) Prior Publication Data
US 2008/0218848 A1 Sep. 11, 2008

(30) Foreign Application Priority Data
Mar. 9, 2007 (JP) ............... 2007-060616

(51) Int. Cl.
*H04B 10/17* (2006.01)
*H04B 10/12* (2006.01)
(52) U.S. Cl. ............... 359/341.41; 359/341.42
(58) Field of Classification Search ............ 359/341.41, 359/341.42
See application file for complete search history.

(56) References Cited

U.S. PATENT DOCUMENTS

| | | | |
|---|---|---|---|
| 5,202,791 A * | 4/1993 | Kaede | 359/345 |
| 5,940,209 A * | 8/1999 | Nguyen | 359/341.1 |
| 6,049,413 A * | 4/2000 | Taylor et al. | 359/337 |
| 6,069,731 A * | 5/2000 | Bayart | 359/341.41 |
| 6,356,386 B1 * | 3/2002 | Denkin et al. | 359/337 |
| 6,417,965 B1 * | 7/2002 | Ye et al. | 359/341.41 |
| 6,483,636 B1 * | 11/2002 | Sugaya et al. | 359/349 |
| 6,498,677 B1 * | 12/2002 | Sun et al. | 359/341.4 |
| 6,891,659 B2 * | 5/2005 | Kikuchi | 359/334 |
| 2002/0027706 A1* | 3/2002 | Park et al. | 359/341.41 |
| 2007/0139774 A1* | 6/2007 | Ohtani | 359/515 |

FOREIGN PATENT DOCUMENTS

| | | |
|---|---|---|
| JP | 09312618 A | 12/1997 |
| JP | 2002084024 A | 3/2002 |
| JP | 2004282025 A | 10/2004 |
| JP | 2006120969 A | 5/2006 |

\* cited by examiner

*Primary Examiner*—Eric Bolda

(57) ABSTRACT

An optical amplifier includes a detecting section configured to detect a part of an input optical signal from a first node on an input side optical fiber; and a rare earth element doped optical fiber amplifier configured to amplify a remaining part of the input optical signal supplied from the input side optical fiber by using an excitation optical signal supplied from a second node and to output the amplified optical signal as an output optical signal to an output side optical fiber. A control unit controls the excitation optical signal based on the detected part of the input optical signal by the detecting section without real time control based on the output optical signal.

9 Claims, 4 Drawing Sheets

OPTICAL AMPLIFIER, OPTICAL AMPLIFIER CONTROLLER AND CONTROL METHOD OF THE SAME

This Patent Application is based on Japanese Patent Application No. 2007-060616 filed Mar. 9, 2007. The disclosure thereof is incorporated herein by reference.

TECHNICAL FIELD

The present invention relates to control of an optical amplifier.

BACKGROUND ART

In recent years, optical communication networks have been widespread and new optical communication networks are being built in various places. For the spread of optical communication networks, there is a demand for cost reduction.

An optical amplifier for amplifying an optical signal transmitted via an optical fiber is an important element of the optical communication network. As an optical amplifier, a rare earth doped optical fiber amplifier is known. As an example of a typical rare earth element doped optical fiber, an optical amplifier (EDFA: EDF Amplifier) using an erbium-doped optical fiber (EDF: Erbium-Doped Fiber) is known. As another example of the optical amplifier, a Raman amplifier for amplifying an optical signal by using stimulated Raman scattering of the optical fiber used as a general transmission line is known.

In conjunction with the above description, an optical fiber amplifier is described in Japanese Patent Application Publication (JP-P2004-282025A). Also, an optical amplifier is described in Japanese Patent Application Publication (JP-P2006-120969A). Also, an optical surge-capable optical receiver is described in Japanese Patent Application Publication (JP-A-Heisei 9-312618). In addition, an optical amplifier is described in Japanese Patent Application Publication (JP-P2002-084024A).

SUMMARY

An object of the present invention is to provide an optical amplifier, which is resistant to transitional change, a controller for the optical amplifier, an optical communication network, and a control method of the optical amplifier.

In an exemplary aspect of the present invention, an optical amplifier includes: a detecting section configured to detect a part of an input optical signal from a first node on an input side optical fiber; a rare earth element doped optical fiber amplifier configured to amplify a remaining part of the input optical signal supplied from the input side optical fiber by using an excitation optical signal supplied from a second node and to output the amplified optical signal as an output optical signal to an output side optical fiber; and a control unit configured to control the excitation optical signal based on the detected part of the input optical signal by the detecting section without real time control based on the output optical signal.

In another exemplary aspect of the present invention, an optical amplifier control unit includes a detecting section configured to detect a part of an input optical signal from a first node on an input side optical fiber; and a control unit configured to control an excitation optical signal for a rare earth element doped optical fiber amplifier which amplifies a remaining part of the input optical signal supplied from the input side optical fiber by using the excitation optical signal and outputs the amplified optical signal as an output optical signal to an output side optical fiber, based on the detected part of the input optical signal without real time control based on the output optical signal.

In another exemplary aspect of the present invention, an optical communication network includes an optical fiber network; and an optical fiber amplifier which amplifies an optical signal transmitted on the optical fiber network. The optical fiber amplifier includes a detecting section configured to detect a part of an input optical signal from a first node on an input side optical fiber; a rare earth element doped optical fiber amplifier configured to amplify a remaining part of the input optical signal supplied from the input side optical fiber by using an excitation optical signal supplied from a second node and to output the amplified optical signal as an output optical signal to an output side optical fiber; and a control unit configured to control the excitation optical signal based on the detected part of the input optical signal by the detecting section without real time control based on the output optical signal.

In another exemplary aspect of the present invention, a method of controlling an optical amplifier, includes detecting a part of an input optical signal from a first node on an input side optical fiber; amplifying a remaining part of the input optical signal by using an excitation optical signal supplied from a second node to output as an output optical signal to an output side optical fiber; and controlling the excitation optical signal based on the detected part of the input optical signal by the detecting section without real time control based on the output optical signal.

In another exemplary aspect of the present invention, a computer-readable software product in which a program code is written for realizing a method of controlling an optical amplifier. The method includes detecting a part of an input optical signal from a first node on an input side optical fiber; amplifying a remaining part of the input optical signal by using an excitation optical signal supplied from a second node to output as an output optical signal to an output side optical fiber; and controlling the excitation optical signal based on the detected part of the input optical signal by the detecting section without real time control based on the output optical signal.

BRIEF DESCRIPTION OF DRAWINGS

The above and other objects, advantages and features of the present invention will be more apparent from the following description of certain exemplary embodiments taken in conjunction with the accompanying drawings, in which.

EXEMPLARY EMBODIMENTS

Figure 1:
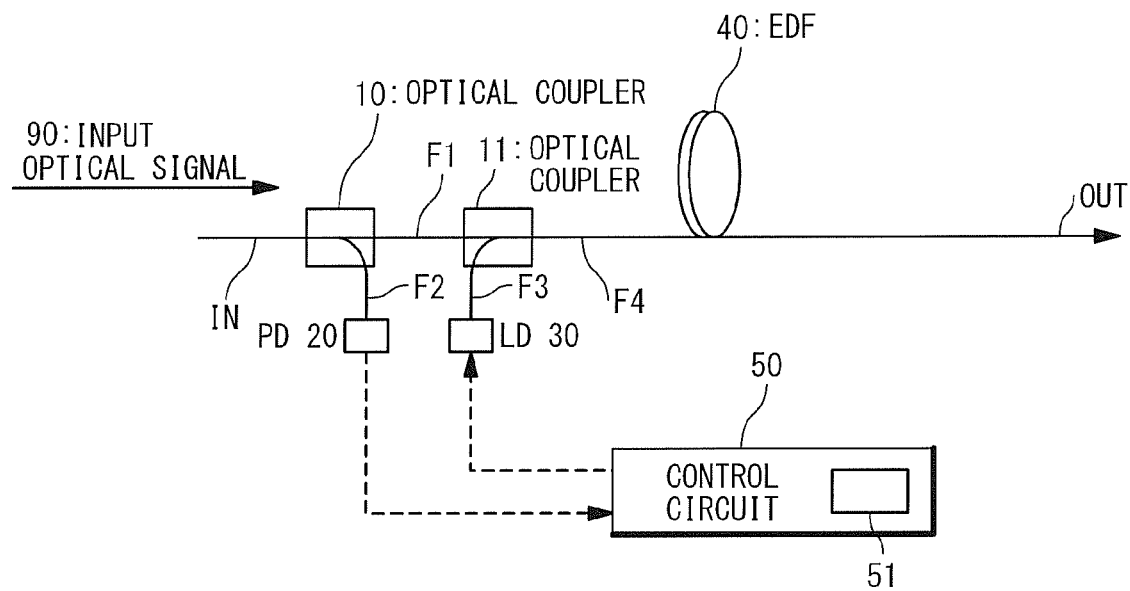
FIG. 1 is a block diagram showing a configuration of an optical amplifier according to a first exemplary embodiment of the present invention.

Hereinafter, an optical amplifier according to exemplary embodiments of the present invention will be described with reference to the attached drawings. In the drawings, solid lines represent an optical connection and dotted lines represent an electrical connection.

FIG. 1 is a block diagram showing a configuration of the optical amplifier according to a first exemplary embodiment of the present invention. An input-side optical fiber IN is connected to an output-side optical fiber OUT via an erbium-doped fiber (EDF) 40. An optical coupler 10 is connected to an optical output terminal of the input-side optical fiber IN and separates an input optical signal onto an optical signal on an optical fiber F1 and an optical signal on an optical fiber F2. An optical input terminal of a photo diode (PD) 20 is connected to the output terminal of the optical fiber F2. A control circuit 50 is connected to an electrical output terminal of the photo diode 20.

The control circuit 50 has a memory 51 and a CPU (not shown). The memory 51 stores a control program and a control data. The control data represents correspondence of a signal level of the optical signal on the optical fiber F1 and a target excitation level of an exciting laser beam emitted from a laser diode (LD) 30. That is, the control data represents a rule for uniquely determining a control signal to be outputted to the laser diode 30 in accordance with an electrical signal supplied from the photo diode 20, and can be provided as a table or a function showing the correspondence. The control program is software to be executed by the CPU. When the electrical signal is received from the photo diode 20, a control signal is generated based on the control data and outputted to the laser diode 30.

An electrical input terminal of the laser diode 30 is connected to an electrical output terminal of the control circuit 50. An optical output terminal of the laser diode 30 is connected to an optical fiber F3. The optical coupler 11 synthesizes the optical signals on the optical fibers F1 and F3 and outputs the synthesized optical signal onto an optical fiber F4. The optical signal on the optical fiber F4 is supplied to the output-side optical fiber OUT via the erbium-doped fiber 40.

Such an optical amplifier operates as follows. An input optical signal 90 is received from the input-side optical fiber IN. A part of the input optical signal 90 is branched by the optical coupler 10 and supplied to the photo diode 20 via the optical fiber F2. A remaining part of the input optical signal 90 is supplied to the optical coupler 11 via the optical fiber F1.

The photo diode 20 converts the optical signal into the electrical signal and sends the converted signal to the control circuit 50. In response to the electrical signal supplied from the photo diode 20, the control circuit 50 outputs the control signal to the laser diode 30 based on the control data. In response to the control signal, the laser diode 30 generates an exciting laser beam for exciting the erbium-doped fiber 40 and sends the laser beam to the optical coupler 11 via the optical fiber F3. The optical signal on the optical fiber F1 and the exciting laser beam on the optical fiber F3 are synthesized by the optical coupler 11 and sent to the erbium-doped fiber 40. $Er^{3+}$ (erbium ion) in the erbium-doped fiber 40 is excited with the exciting laser beam. The optical signal supplied from the optical fiber F4 is amplified with excited $Er^{3+}$ in the erbium-doped fiber 40 and the amplified optical signal is supplied to the output-side optical fiber OUT.

Figure 2:
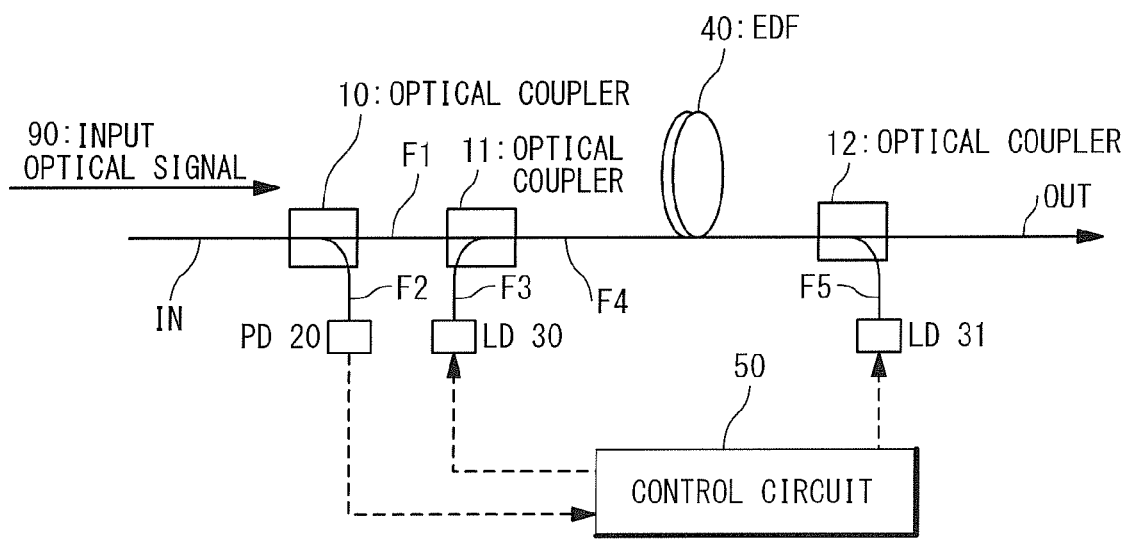
FIG. 2 is a block diagram showing a configuration of the optical amplifier according to a modification example of the first exemplary embodiment.

In a modification example of such an optical amplifier, as shown in FIG. 2, a plurality of laser diodes may be provided. In FIG. 2, unlike the configuration of FIG. 1, an optical coupler 12 is inserted after the erbium-doped fiber 40. A laser diode 31 is connected to the optical coupler 12 to supply the exciting laser beam to the erbium-doped fiber 40. In order to control the laser diode 31, the control circuit 50 has the control data and a control program which are the same as or independent from those for the laser diode 30. Based on the electrical signal generated by the photo diode 20, the control circuit 50 controls the exciting laser beam of the laser diode 30 and the exciting laser beam of the laser diode 31.

According to such an optical amplifier of the present exemplary embodiment, an output control of the optical amplifier can be performed by monitoring the signal level of the input optical signal without any other optical signal. The control based on the optical signal on the output-side optical fiber OUT on the output side of the erbium-doped fiber 40 is not necessary and is not performed.

Also, since control of the exciting laser beam according to a preset optical output control method can be directly performed by monitoring only the input signal level, as compared to the related art method of monitoring input and output, it is more resistant to transitional change. Also, the control can be achieved even when a plurality of laser diodes are to be controlled. In addition, since there is no need to monitor the output signal level, unlike the related art optical amplifier in which input and output signal levels are monitored to adjust the laser diode exciting beam, a configuration can be simplified.

Also, the laser diode excitation level corresponding to the input optical signal level can be controlled based on the control data previously stored in a memory by various control methods (for example, constant gain control, constant output control, constant gain and constant output control).

Also, the control data for the various control methods may be stored in the memory, and the control circuit can freely switch the control method in response to an external command.

Also, the optical amplifier of the present invention can be applied to a multi-wavelength optical signal. Also, the optical signal can be amplified irrespective of a signal modulation technique or a bit rate.

Although the erbium-doped fiber is used in the present exemplary embodiment, the other rare earth element doped optical fibers, for example, neodymium-doped optical fiber may be used.

Figure 3:
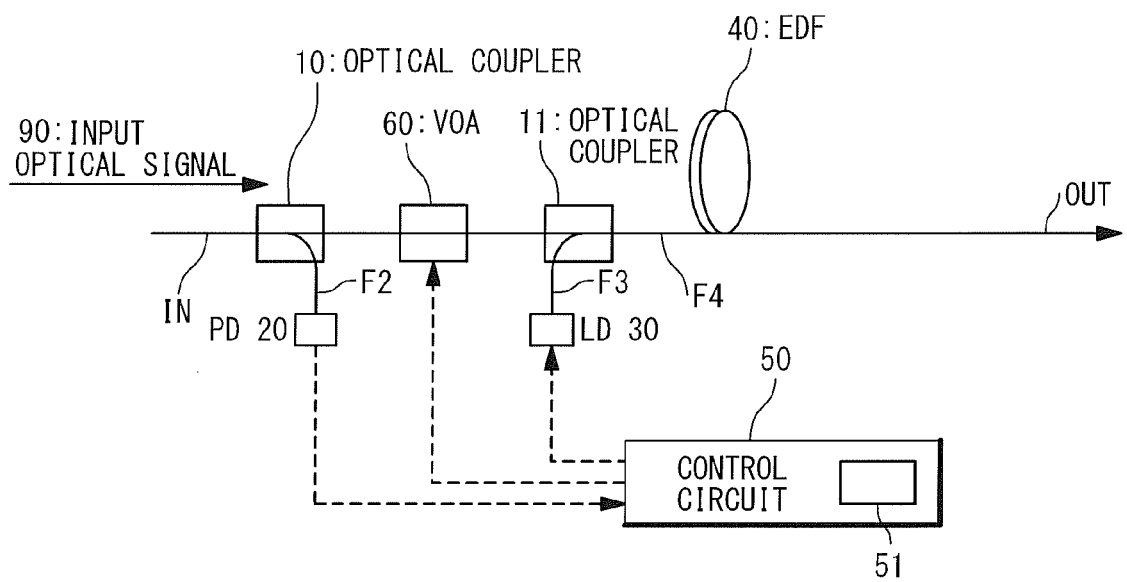
FIG. 3 is a block diagram showing a configuration of the optical amplifier according to a second exemplary embodiment of the present invention.

FIG. 3 is a block diagram showing the configuration of the optical amplifier according to a second exemplary embodiment of the present invention. The optical amplifier in the second exemplary embodiment has a variable optical attenuator (VOA) 60. The variable optical attenuator 60 is provided on the optical fiber F1 for connecting the optical coupler 10 to the optical coupler 11 in the first exemplary embodiment. The control circuit 50 generates a VOA control signal based on the electrical signal supplied from the photo diode 20, by using a VOA control program and a VOA control data to control the variable optical attenuator 60. The VOA control program and the VOA control data are previously stored separately from the control program and the control data for controlling the laser diode 30. Thus, the variable optical attenuator 60 is controlled based on the optical signal detected from the input optical signal 90.

By the VOA control program and the VOA control data, the variable optical attenuator 60 is subjected to ALC (Automatic Level Control) control. The laser diode 30 is subjected to AGC (Automatic Gain Control) control. The optical signal is supplied to the variable optical attenuator 60, is subjected to the constant output control, is synthesized with the exciting laser beam from the laser diode 30 by the optical coupler 11, and amplified by the erbium-doped fiber 40 to perform constant gain control.

Figure 4:
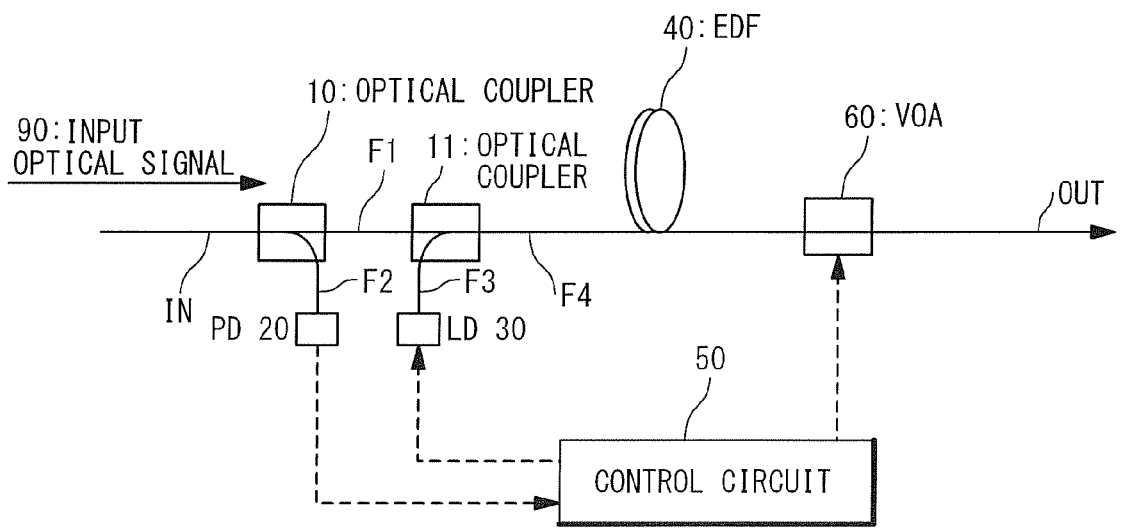
FIG. 4 is a block diagram showing a configuration of the optical amplifier according to a third exemplary embodiment of the present invention.

FIG. 4 is a block diagram showing the configuration of the optical amplifier according to a third exemplary embodiment of the present invention. In the third exemplary embodiment, a position of the variable optical attenuator 60 in the second exemplary embodiment is moved to an output side of the erbium-doped fiber 40. The optical signal received from the input-side optical fiber IN is separated by the optical coupler 10 and supplied to the optical coupler 11 and the photo diode 20. The control circuit 50 monitors the level of the input optical signal supplied to the photo diode 20. The control circuit 50 refers to a previously stored table to perform ALC-control for the variable optical attenuator 60 and AGC-control for the laser diode 30. As in the second exemplary embodiment, the variable optical attenuator 60 is controlled based on the optical signal detected from the input optical signal by the photo diode 20. Through this control, the optical signal supplied to the optical coupler 11 is synthesized with the exciting laser beam from the laser diode 30 by the optical coupler 11, amplified at the erbium-doped fiber 40 in accordance with a constant gain control, and adjusted by the variable optical attenuator 60 in accordance with a constant output control.

Figure 5:
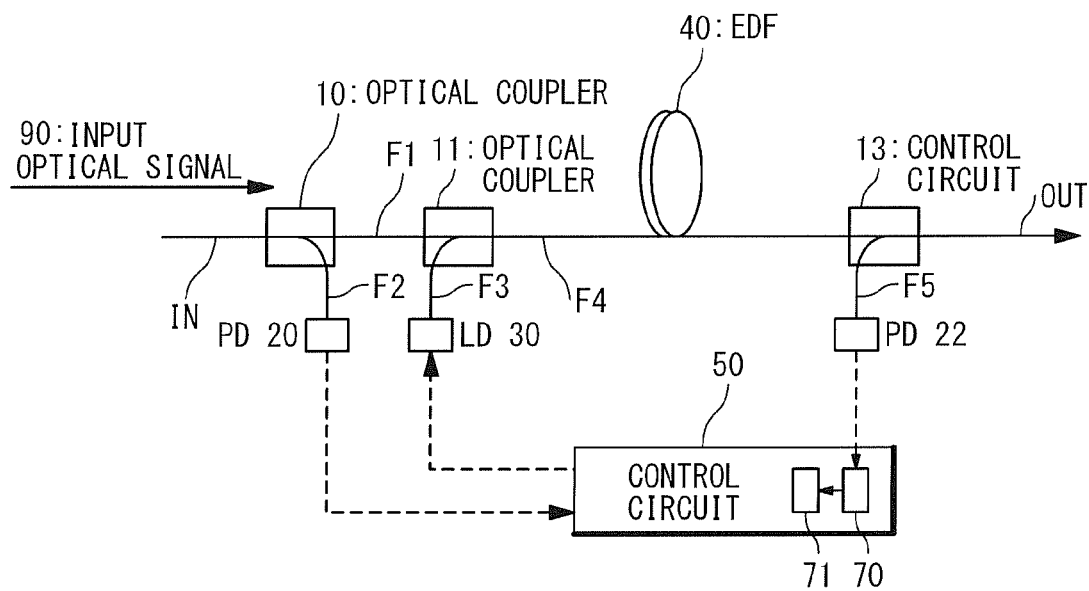
FIG. 5 is a block diagram showing a configuration of the optical amplifier according to a fourth exemplary embodiment of the present invention.

FIG. 5 is a block diagram showing the optical amplifier according to a fourth exemplary embodiment of the present invention. As compared to the optical amplifier in the first exemplary embodiment, in the optical amplifier in the present exemplary embodiment, an optical coupler 13 is provided for detecting a reflection signal, sent from the output-side optical fiber OUT, of the optical signal outputted from the erbium-doped fiber 40. A photo diode 22 is connected to an optical output terminal of the optical fiber F5 on the optical coupler 13. The photo diode 22 converts the optical reflection signal, which is detected from the output-side optical fiber OUT by the optical coupler 13 and transmitted on the optical fiber F5, into an electrical signal and transmits the converted signal to a characteristic monitoring section 70 of the control circuit 50. When the optical amplifier normally operates, the exciting laser beam of the laser diode 30 is controlled so that an automatic gain control may be performed by the erbium-doped fiber 40. However, there is a case that the level of the output optical signal from the erbium-doped fiber 40 is decreased due to age-related deterioration of the laser diode 30 even when the control signal for the laser diode 30 remains unchanged. Thus, the age-related deterioration of the laser diode 30 may cause decrease in a gain in the automatic gain control from a set value. In this case, the control circuit 50 calibrates the table of the control data for controlling the laser diode 30, based on the output optical signal.

Specifically, the characteristic monitoring section 70 of the control circuit 50 monitors the output optical signal and generates a characteristic data indicating change in characteristics of the optical amplifier based on the electrical signal received from the photo diode 22. When the characteristic monitoring section 70 detects based on the characteristic data that the level of the output optical signal falls below a predetermined reference value, a calibrating section 71 of the control circuit 50 rewrites the previously prepared table or the control data (in the first exemplary embodiment) in accordance with a procedure defined previously by the program such that the control operation of the laser diode 30 is adjusted to perform an automatic gain control of the signal level of the output optical signal from the erbium-doped fiber 40.

Configuration of units on the optical path on the input side from the erbium-doped fiber 40 and control of the optical devices in the optical amplifier in the present exemplary embodiment are the same as those in the first exemplary embodiment. As described above, the optical coupler 13 is connected to the output side from the erbium-doped fiber 40 to detect the reflection signal level. By using the detected reflection signal, change in characteristics due to age-related deterioration of the laser diode 30 or the like can be detected and compensated. This is well known, and therefore, the description is omitted.

In the present exemplary embodiment, the optical signal on the output side of the erbium-doped fiber 40 is used only for calibrating the change in characteristics of the optical amplifier in a relatively long period due to age-related deterioration. A real-time control to the laser diode 30 with the exciting laser beam can be performed based on only the electrical signal generated by the photo diode 20 without using the reflection optical signal on the output side.

Figure 6:
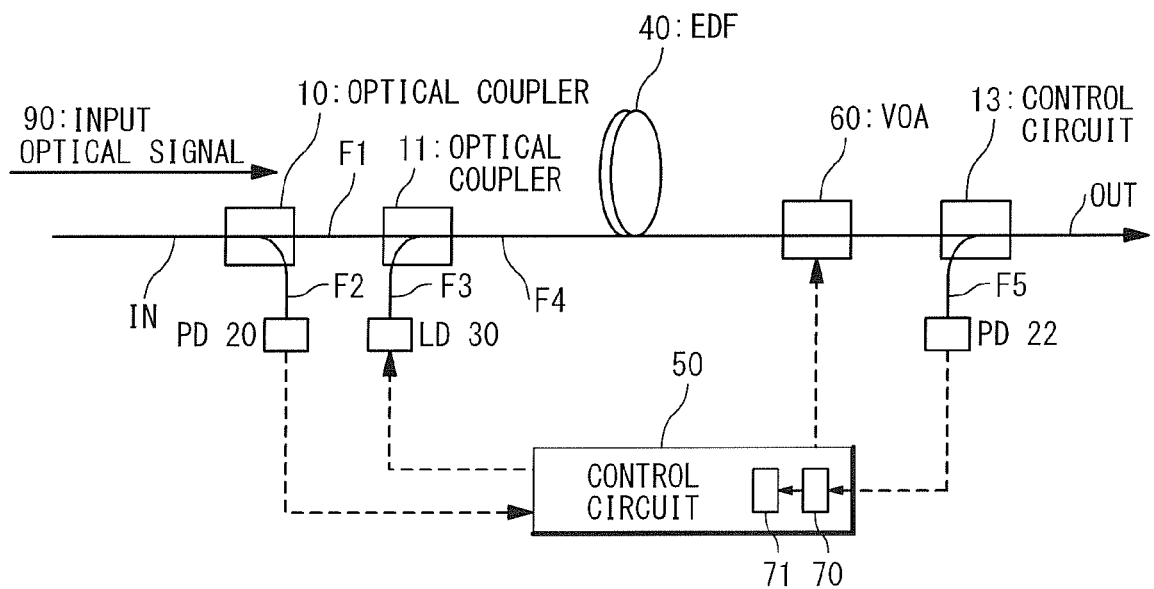
FIG. 6 is a block diagram showing a configuration of the optical amplifier according to a fifth exemplary embodiment of the present invention.

FIG. 6 shows the optical amplifier according to a fifth exemplary embodiment. As compared to the fourth exemplary embodiment, in the optical amplifier in the present exemplary embodiment, the variable optical attenuator 60 is provided on an optical fiber connecting the erbium-doped fiber 40 to the optical coupler 13. By monitoring the electrical signal outputted from the photo diode 22, the characteristic monitoring section 70 of the control circuit 50 determines whether or not a result of the automatic gain control by the erbium-doped fiber 40 exceeds a predetermined reference value. When the characteristic monitoring section 70 determines that the automatic gain control result exceeds the predetermined reference value, the calibrating section 71 sends a control signal to the variable optical attenuator 60 to adjust the output optical signal level from the variable optical attenuator 60, thereby improving an accuracy of the output level.

Figure 7:
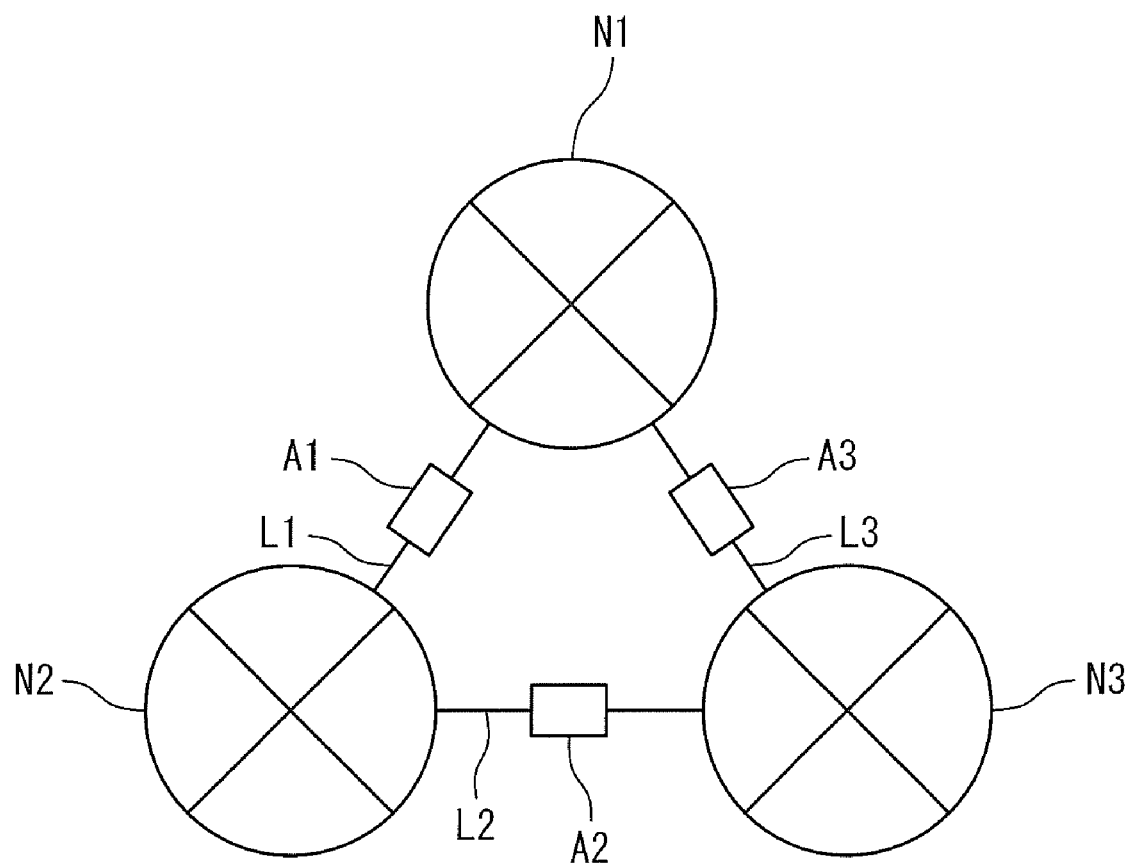
FIG. 7 is a block diagram showing an optical communication network.

FIG. 7 is a block diagram showing an optical communication network to which the optical amplifiers are applied. The optical communication network includes partial networks N1 to N3 connected via long-distance optical fiber cables L1 to L3. The optical amplifiers A1 to A3 having configurations described in the first to fifth exemplary embodiments are provided in the long-distance optical fiber cables L1 to L3, respectively. Since the optical amplifiers A1 to A3 have simple configurations, a reliable optical communication network can be built at low costs.

According to the present invention, an optical amplifier which is resistant to transitional change is provided. Also, the optical amplifier capable of easily performing control is provided even when a plurality of laser diodes for supplying exciting light beam to a rare earth element doped optical fiber are used. Also, an optical amplifier with simple configuration is provided which does not require monitoring of an output signal level.

Moreover, according to the present invention, the optical amplifier which can easily switching of different types of control such as constant gain control, constant output control, and constant gain and constant output control is provided. Also, the optical amplifier suitable for a multi-wavelength optical signal is provided.

In addition, according to the present invention, the optical amplifier capable of amplifying a signal irrespective of a signal modulation technique or bit rate is provided.

Although the present invention has been described above in connection with several exemplary embodiments thereof, it will be appreciated by those skilled in the art that those exemplary embodiments are provided solely for illustrating the present invention, and should not be relied upon to construe the appended claims in a limiting sense.

What is claimed is:

1. An optical amplifier comprising:
 a detecting section configured to detect a part of an input optical signal from a first node on an input side optical fiber;
 a rare earth element doped optical fiber amplifier configured to amplify a remaining part of the input optical signal supplied from said input side optical fiber by using an excitation optical signal supplied from a second node and to output the amplified optical signal as an output optical signal to an output side optical fiber;
 a control unit configured to control said excitation optical signal based on the detected part of the input optical signal by said detecting section without real time control based on the output optical signal;
 a monitoring section configured to monitor a reflection level of an optical reflection signal sent from said output side optical fiber; and
 a characteristic monitoring section configured to generate a characteristic data based on the detected part of the input optical signal by said detecting section and the reflection level of the optical reflection signal to indicate a change of a characteristic of said optical amplifier.

2. The optical amplifier according to claim 1, further comprising:
 a storage section which stores correspondence relation of a signal level of the detected part of the input optical signal and an excitation level of the excitation optical signal,
 wherein said control unit refers to the corresponding relation in said storage section to control the excitation optical signal based on the excitation level corresponding to the detected part of the input optical signal, wherein said optical amplifier further comprises:
 a calibrating section configured to update said correspondence relation in said storage section based on said characteristic data.

3. The optical amplifier according to claim 2, wherein said calibrating section updates said correspondence relation based on a procedure previously stored in said storage section such that said optical amplifier is subjected to automatic gain control.

4. The optical amplifier according to claim 1, further comprising:
 a variable optical attenuator connected between said first node and said second node on said input side optical fiber,
 wherein said control unit controls said variable optical attenuator based on only the detected part of the input optical signal.

5. The optical amplifier according to claim 1, further comprising:
 a variable optical attenuator provided in said output side optical fiber to control the output optical signal from said rare earth element doped optical fiber amplifier,
 wherein said control unit controls said variable optical attenuator based on only the detected part of the input optical signal.

6. An optical amplifier controller comprising:
 a detecting section configured to detect a part of an input optical signal from a first node on an input side optical fiber;
 a control unit configured to control an excitation optical signal for a rare earth element doped optical fiber amplifier which amplifies a remaining part of the input optical signal supplied from said input side optical fiber by using the excitation optical signal and outputs the amplified optical signal as an output optical signal to an output side optical fiber, based on the detected part of the input optical signal without real time control based on the output optical signal;
 a monitoring section configured to monitor a reflection level of an optical reflection signal sent from said output side optical fiber; and
 a characteristic monitoring section configured to generate a characteristic data based on the detected part of the input optical signal by said detecting section and the reflection level of the optical reflection signal to indicate a change of a characteristic of said optical amplifier.

7. The optical amplifier controller according to claim 6, comprising:
 a storage section which stores correspondence relation of a signal level of the detected part of the input optical signal and an excitation level of the excitation optical signal;
 wherein said control unit refers to the corresponding relation in said storage section to control the excitation optical signal based on the excitation level corresponding to the detected part of the input optical signal; and
 a calibrating section configured to update said correspondence relation in said storage section based on said characteristic data.

8. The optical amplifier controller according to claim 7, wherein said control unit controls a variable optical attenuator based on only the detected part of the input optical signal.

9. An optical communication network comprising:
 an optical fiber network; and
 an optical fiber amplifier which amplifies an optical signal transmitted on said optical fiber network, wherein said optical fiber amplifier comprises:
 a detecting section configured to detect a part of an input optical signal from a first node on an input side optical fiber;
 a rare earth element doped optical fiber amplifier configured to amplify a remaining part of the input optical signal supplied from said input side optical fiber by using an excitation optical signal supplied from a second node and to output the amplified optical signal as an output optical signal to an output side optical fiber;
 a control unit configured to control said excitation optical signal based on the detected part of the input optical signal by said detecting section without real time control based on the output optical signal;
 a monitoring section configured to monitor a reflection level of an optical reflection signal sent from said output side optical fiber; and
 a characteristic monitoring section configured to generate a characteristic data based on the detected part of the input optical signal by said detecting section and the reflection level of the optical reflection signal to indicate a change of a characteristic of said optical amplifier.

* * * * *